April 25, 1933.   P. GREER   1,905,852
GARAGE
Filed Oct. 6, 1930   2 Sheets-Sheet 1
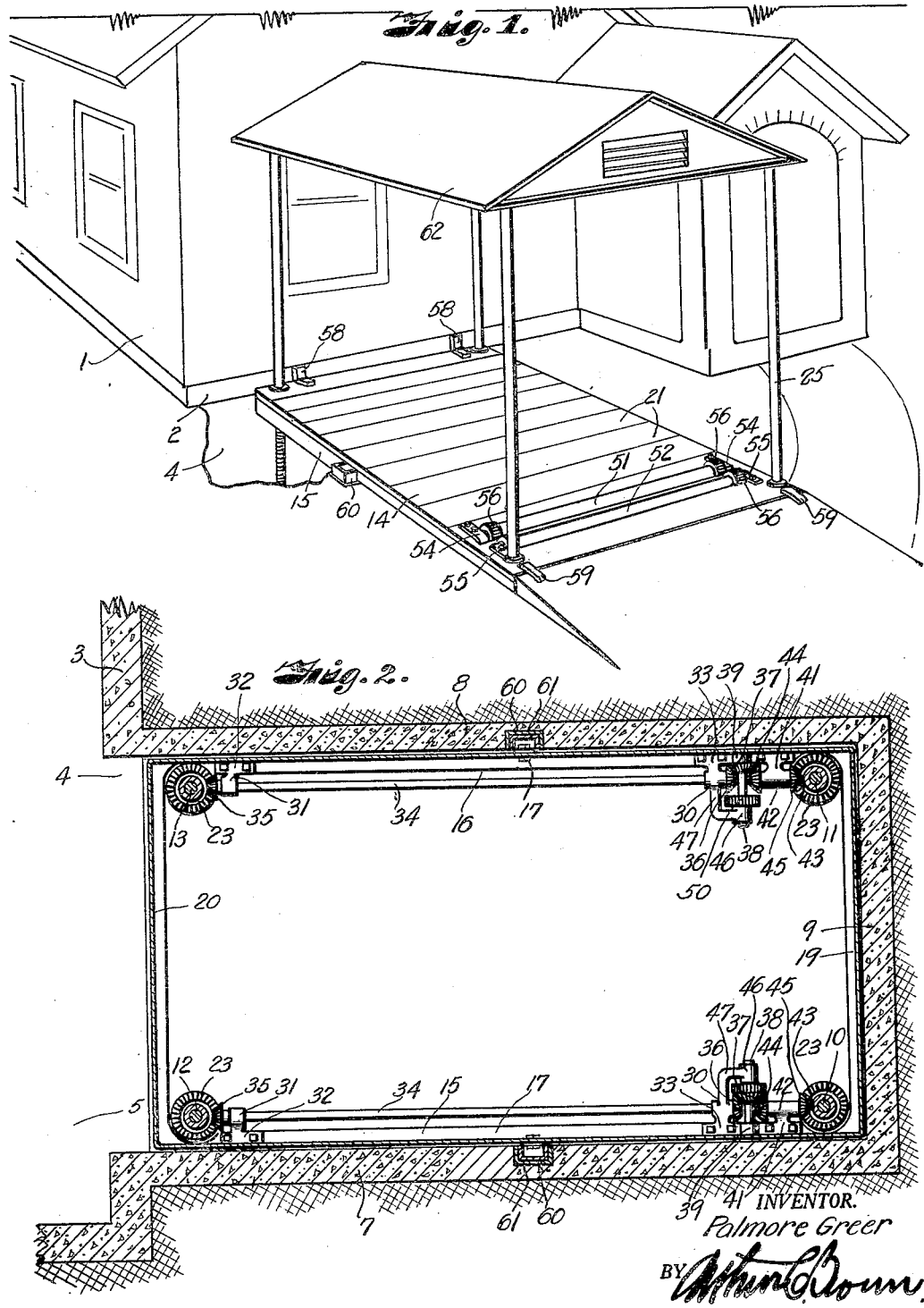

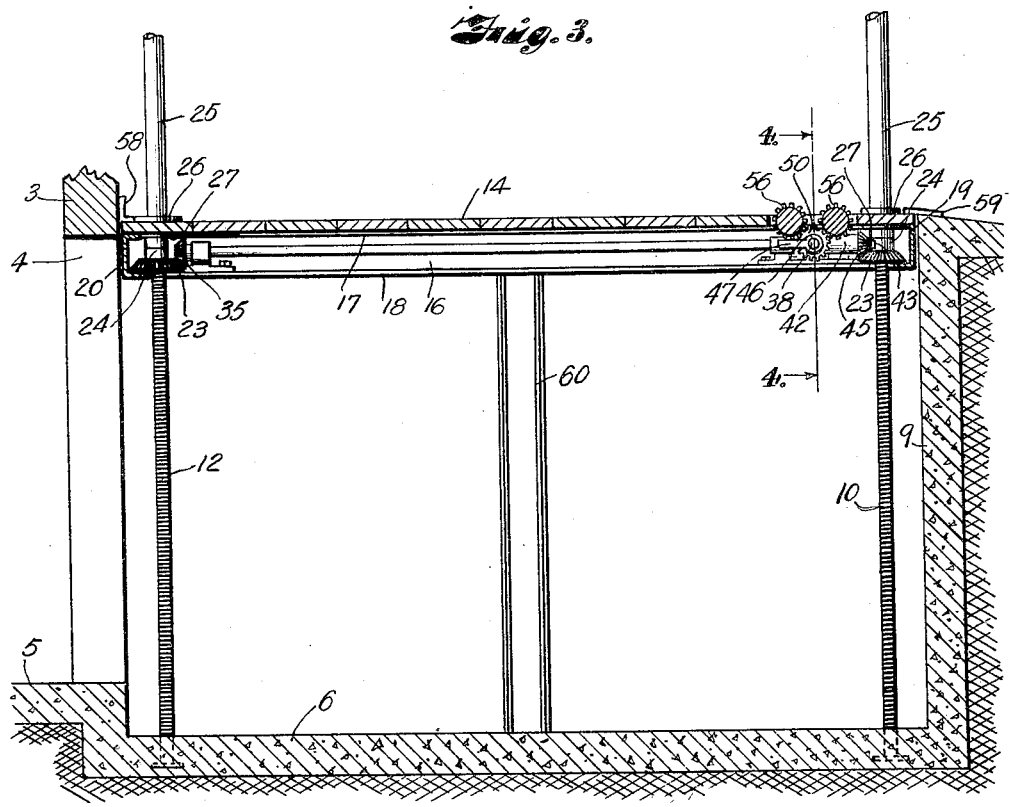
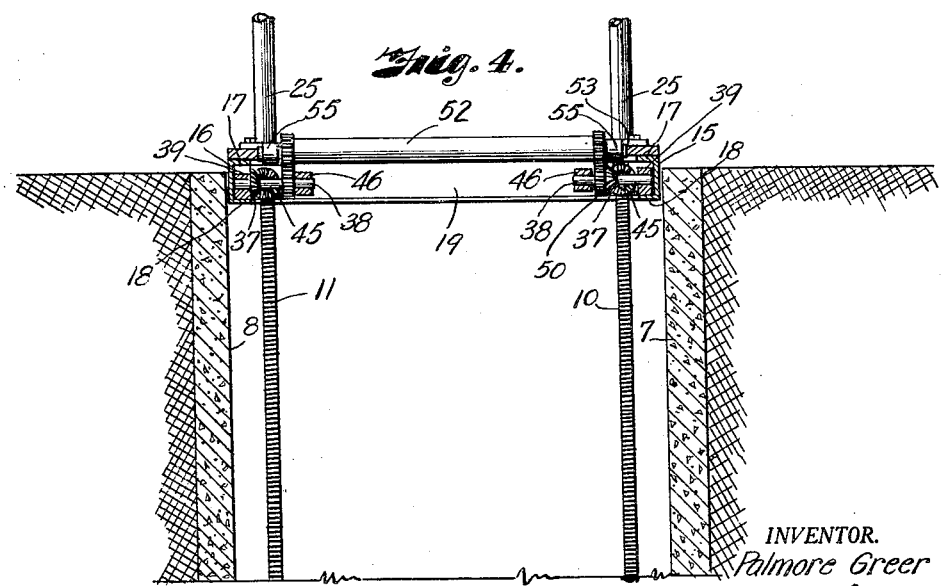

Patented Apr. 25, 1933

1,905,852

UNITED STATES PATENT OFFICE

PALMORE GREER, OF HIGGINSVILLE, MISSOURI

GARAGE

Application filed October 6, 1930. Serial No. 486,654.

My invention relates to garages and more particularly to private garages and elevators for moving an automobile to and from a ground floor level, the principal objects of the invention being to provide a vertically movable platform for transferring an automobile between the ground surface and a basement floor level, to adapt a movable platform to serve as a garage, and to effect operation of the platform by the driving mechanism of the automobile.

In accomplishing these and other objects of my invention, I have provided improved details of structure, the preferred form of which is illustrated in the accompanying drawings, wherein:

Fig. 1 is a fragmentary perspective view of a building having a roofed garage embodying my invention, part of the ground adjacent thereto being broken away to illustrate one of the platform supporting posts.

Fig. 2 is a cross section through the garage pit and adjacent portions of the building wall.

Fig. 3 is a longitudinal section on the center line of Fig. 2, roof-supporting posts being shown fragmentarily.

Fig. 4 is a section on the line 4—4, Fig. 3.

Referring in detail to the drawings:

1 designates generally a building such as a residence including a wall 2 extended downwardly from the ground surface to form the wall 3 of a basement having a door opening 4, and 5 designates the floor of the basement.

A pit sufficiently large to accommodate an automobile is formed in communication with said basement wall opening comprising a floor 6 offset downwardly from the basement floor, vertical side walls 7 and 8, and a vertical front wall 9.

Front and rear pairs of vertical threaded posts 10, 11, 12 and 13 have lower ends fixed in the floor of the pit at the corners thereof in spaced relation with the pit walls, and spaced sufficiently to permit an automobile to pass therebetween, and a platform 14 vertically movable in the pit is provided with suitable openings for mounting the same over the posts for support thereby and movement thereover as presently described.

The platform includes side frame members 15 and 16 preferably comprising channels having upper and lower flanges 17 and 18 presented toward the median line of the platform, similar channels 19 and 20 forming end frame members fixed to the side channels, and planks 21 mounted on the upper edges of the channels to provide the floor for supporting an automobile or the like.

Bevel gears 23 having internal threads for mounting the same on the threaded posts are located between the flanges of the channels at the corners of the platform frame and provided with collars 24 having ends rotatively abutting the lower ends of tubular posts or standards 25 extending in said platform openings and upwardly from the platform, and fixed thereto by collar-like clamping members 26 and 27. The platform is then supported from the rotative beveled gears, and the standards will telescope freely over the threaded posts when the platform is lowered.

Mounted in pairs of aligned bearings 30 and 31 projecting from laterally extending brackets 32 and 33 fixed to the side frame channels are relatively long shafts 34 having bevel gears 35 at their inner or rear ends meshed with the bevel gears 23 on the pair of threaded posts adjacent the building, and bevel gears 36 at their front ends meshed with bevel gears 37 fixed to transverse stub shafts 38 rotatively mounted in bearings 39 fixed to the side frame channels.

Brackets 41 fixed to the side frame members adjacent the transverse stub shafts have tubular bearings 42 supporting short shafts 43 having bevel gears 44 meshed with said operating bevel gears 37 and bevel gears 45 on their opposite ends meshed with the platform supporting gears 23 at the front end of the platform.

The inwardly projecting ends of the stub shafts 38 are journaled in bearings 46 offset from and supported on arms 47 projecting inwardly of the pit from the brackets 33.

In order to effect rotation of the operating bevel gears 37 to rotate the several shafts and thus threadedly move the platform supporting gears on the threaded posts, I provide a pair of laterally spaced spur gears 50 keyed to the stub shafts between the bearings 39 and 46, and means presently described in driving relation with said gears whereby an automobile may move the platform. Parallel slightly spaced friction rollers 51 and 52 on shafts 53 are located in transverse slots formed in the outer end portion of the platform and supported in bearings 54 and 55 mounted on the upper edges of the side frame members. Gears 56 fixed to the roller shafts are meshed with said spur gears 50 whereby the rotating traction wheels of an automobile located on said rollers and frictionally engaging the same may effect rotation of the rollers and thus rotate the platform supporting gears on the threaded posts to move the platform vertically in the pit.

Attention is called to the fact that the bevel gears 37 face in the same direction, and are therefore located on opposite sides of the shaft bevel gears 36 and 44, whereby the operating gears 37 may effect rotation of the shafts 34 and 43 in the same direction.

Stop members 58 and 59 preferably comprising plates fixed to the building wall and slightly inclined approach to the platform project short distances across the pit to engage the platform and check upward movement thereof.

Guide channels 60 are mounted in vertical grooves 61 formed in the side walls of the pit adjacent the middle lines of said walls and guide ribs fixed to the platform slidably engage in the grooves formed by said guide channels to retain the platform in proper position in the pit and prevent binding of the threaded gears on the posts.

A roof 62 is preferably mounted on the upper ends of the tubular standards to cover an automobile mounted on the platform and also to cover the pit when the platform is lowered.

In using the invention, an automobile may be driven onto the platform and the driving wheels stopped on the rollers. The engine of the automobile is then operated to rotate the wheels and effect rotation of the rollers, operating shafts and platform supporting gears in one direction to lower the platform into the pit to the level of the basement floor.

Engagement of the platform with the floor of the pit will prevent further downward movement of the bevel gears on the threaded posts, and thus lock the rollers, whereby continued rotation of the automobile wheels will, if desired effect movement of the automobile from the rollers and platform to the basement floor.

When it is desired to move the automobile from the basement it may be driven onto the platform and a pair of drive wheels located on the rollers. The direction of rotation of the drive wheels will be reversed to effect reverse rotation of the platform supporting gears on the threaded posts for elevating the platform.

When the platform encounters the stop members, rotation of the gears and rollers will be prevented, and the automobile will move from the platform to the ground surface.

The roofed platform movable in the pit thus provides a complete garage, whereby the automobile may be stored below the ground surface and protected, the use of long or steep driveways into basement garages and the many objectionable incidents to the presence of a depressed driveway, are avoided.

What I claim and desire to secure by Letters Patent is:

1. A garage including a rectangular platform, vertical threaded posts extending through said platform adjacent its corners, gears rotatively mounted on the platform and threaded on the posts, means for operably connecting the gears at each side edge of the platform including spaced aligning shafts, pinions fixed on the shafts and meshing with said gears, spaced aligning counter shafts on the platform and having driving connection with said spaced aligning shafts, and common means operable by an automobile mounted on the platform for operating counter shafts to move the platform vertically on the posts.

2. A garage including a rectangular platform, a vertical threaded post extending through said platform adjacent each of its corners, gears rotatively mounted on the platform and threaded on the posts, means for operably connecting the gears along each side of the platform including spaced aligning shafts, pinions on the shafts meshing with said gears, gear means for driving said shafts in opposite directions, and means operable by an automobile mounted on the platform for operating said driving means to move the platform vertically on the posts.

In testimony whereof I affix my signature.

PALMORE GREER.